United States Patent
Gray et al.

(10) Patent No.: US 9,688,243 B2
(45) Date of Patent: Jun. 27, 2017

(54) SYSTEM AND METHOD FOR CREATING AND DISTRIBUTING DIAGNOSTIC TESTS IN AN ADAPTIVE DIAGNOSTIC DEVELOPMENT PLATFORM

(71) Applicant: Service Solutions U.S. LLC, Warren, MI (US)

(72) Inventors: Kevin Gray, Kalamazoo, MI (US); Matthew Pasztor, Kalamazoo, MI (US); William W. Wittliff, III, Gobles, MI (US)

(73) Assignees: Robert Bosch GmbH, Stuttgart (DE); Bosch Automotive Service Solutions Inc., Warren, MI (US)

( * ) Notice: Subject to any disclaimer, the term of this patent is extended or adjusted under 35 U.S.C. 154(b) by 592 days.

(21) Appl. No.: 13/796,744

(22) Filed: Mar. 12, 2013

(65) Prior Publication Data
US 2014/0273810 A1    Sep. 18, 2014

(51) Int. Cl.
*H04W 4/00*    (2009.01)
*B60R 25/00*    (2013.01)
*H04L 29/08*    (2006.01)

(52) U.S. Cl.
CPC .............. *B60R 25/00* (2013.01); *H04L 67/12* (2013.01)

(58) Field of Classification Search
CPC ......... H04W 4/001; H04L 67/12; H04L 12/66
See application file for complete search history.

(56) References Cited

U.S. PATENT DOCUMENTS

| | | | | |
|---|---|---|---|---|
| 6,128,560 A | * | 10/2000 | Ishii | G01R 31/007 307/10.1 |
| 8,355,837 B2 | * | 1/2013 | Avery | G01R 31/007 701/29.1 |
| 8,863,256 B1 | * | 10/2014 | Addepalli | H04W 4/046 713/168 |
| 8,930,067 B1 | * | 1/2015 | Green | G06Q 20/127 345/168 |
| 2007/0083303 A1 | * | 4/2007 | O'Sullivan | G07C 5/006 701/31.4 |
| 2007/0083306 A1 | * | 4/2007 | Comeau | G07C 5/008 701/29.6 |
| 2007/0088472 A1 | * | 4/2007 | Ganzhorn, Jr. | G01M 15/102 701/31.4 |
| 2007/0171029 A1 | * | 7/2007 | Inbarajan | G06Q 10/00 340/425.5 |
| 2007/0255528 A1 | * | 11/2007 | Gruenter | F02D 11/105 702/183 |
| 2007/0294002 A1 | * | 12/2007 | Underdal | G07C 5/08 701/29.1 |
| 2010/0042287 A1 | * | 2/2010 | Zhang | G07C 5/008 701/31.4 |
| 2010/0324855 A1 | * | 12/2010 | Parker | G06F 11/2294 702/119 |
| 2011/0035096 A1 | * | 2/2011 | Liebl | G07C 5/008 701/33.4 |

(Continued)

*Primary Examiner* — Bobbak Safaipour
(74) *Attorney, Agent, or Firm* — Baker Hostetler LLP

(57) ABSTRACT

A system and method for creating and distributing diagnostic tests to diagnostic devices. The system includes user devices, diagnostic devices, diagnostic development system and validation/authentication system. The system can create, validate and distribute one or more diagnostic tests to various diagnostic devices. This allows user to have the latest diagnostic tests in a timely manner.

19 Claims, 3 Drawing Sheets

(56) References Cited

U.S. PATENT DOCUMENTS

| | | | |
|---|---|---|---|
| 2011/0035180 A1* | 2/2011 | Jin | H04L 12/66 |
| | | | 702/122 |
| 2012/0245786 A1* | 9/2012 | Fedorchuk | H04L 69/18 |
| | | | 701/29.1 |
| 2013/0049929 A1* | 2/2013 | Gerlach | E05F 15/77 |
| | | | 340/5.64 |
| 2013/0325405 A1* | 12/2013 | Miller | G06F 15/00 |
| | | | 702/183 |
| 2014/0162598 A1* | 6/2014 | Villa-Real | H04M 1/66 |
| | | | 455/411 |
| 2014/0195099 A1* | 7/2014 | Chen | G07C 5/0808 |
| | | | 701/29.6 |
| 2014/0222378 A1* | 8/2014 | Piety | G05B 23/02 |
| | | | 702/183 |
| 2016/0026518 A1* | 1/2016 | Foster | G06F 11/00 |
| | | | 714/15 |

\* cited by examiner

SYSTEM AND METHOD FOR CREATING AND DISTRIBUTING DIAGNOSTIC TESTS IN AN ADAPTIVE DIAGNOSTIC DEVELOPMENT PLATFORM

FIELD OF THE INVENTION

The present invention relates generally to the field of creating and distributing automotive diagnostic tests. More particularly, the present invention relates to the field of creating and distributing automotive diagnostic tests using an adaptive diagnostic development platform.

BACKGROUND OF THE INVENTION

Automotive technicians may repair a variety of vehicles. Also, the technicians may repair a specific component for a variety of vehicles. In repairing vehicles, the technicians have to diagnose the vehicle problems accurately and quickly. The technicians may use both electronic tools and their own judgments in diagnosing vehicle problems. With rapid advancement in vehicles having complex computers and electronic systems, the technician's job has evolved from purely mechanical to include electronic technology. Thus, a variety of different diagnostic tools and diagnostic tests are needed to diagnose various problems of different vehicles.

Also, the different diagnostic tests may be used to diagnose different problems. With the advancement of vehicle technology and development of advanced vehicle models, newer diagnostic tests may be needed to diagnose new problems associated with the advanced models. However, vehicle manufacturers and dealerships may not develop the newer diagnostic tests in time to diagnose the new problems. Thus, technicians may not be able to diagnose the new problems associated with the advanced vehicles. Sometimes, the technician may develop a diagnostic test to diagnose the new problems, but cannot easily share the diagnostic test with other technicians.

Accordingly, it is desirable to provide a system that technicians can access to create and obtain diagnostic tests in order to diagnose different problems associated with advanced vehicles.

SUMMARY OF THE INVENTION

The foregoing needs are met, to a great extent, by the present invention, wherein in one aspect an apparatus is provided that in some embodiments a system and method for creating and distributing diagnostic tests in an adaptive diagnostic development platform.

In accordance with one embodiment of the present invention, an authoring system may include a communication module having a telecommunication circuitry configured to receive one or more diagnostic tests and an approval module having a processor configured to validate the one or more diagnostic tests. The authoring system may also include a distribution module configured to distribute the one or more validated diagnostic tests to a diagnostic device.

In accordance with another embodiment of the present invention, a method of distributing diagnostic tests may include the steps of receiving, via a communication module that may include a telecommunication circuitry, one or more diagnostic tests and validating, via an approval module that may include a processor, the one or more diagnostic tests.

The method of distributing diagnostic tests may also include distributing, via a distribution module, the one or more approved diagnostic tests to a diagnostic device.

In accordance with yet another embodiment of the present invention, an authoring system may include a communication module having a telecommunication circuitry configured to receive one or more diagnostic tests that require validation and an approval module having a processor configured to validate the one or more diagnostic tests through a simulation of the tests. The authoring system may also include a payment module configured to receive a payment from a user; and a distribution module configured to distribute the one or more validated diagnostic tests to a diagnostic device used by the user.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An adaptive diagnostic development system may include a library of functional diagnostic blocks that may be interconnected to each other to form a diagnostic test. For example, each of the functional diagnostic blocks may represent a step or procedure performed in a diagnostic test. The functionality diagnostic block may include software codes that may be executed to perform the steps or procedures of the diagnostic tests. Thus, the functionality diagnostic blocks enable a user to create diagnostic tests without learning to write software codes using the software language. A user may access the adaptive diagnostic development system and create one or more diagnostic tests. The diagnostic tests may be validated or authenticated by the adaptive diagnostic development system. The validated diagnostic tests may be distributed to diagnostic tools or computing devices to execute the diagnostic tests.

Figure 1:
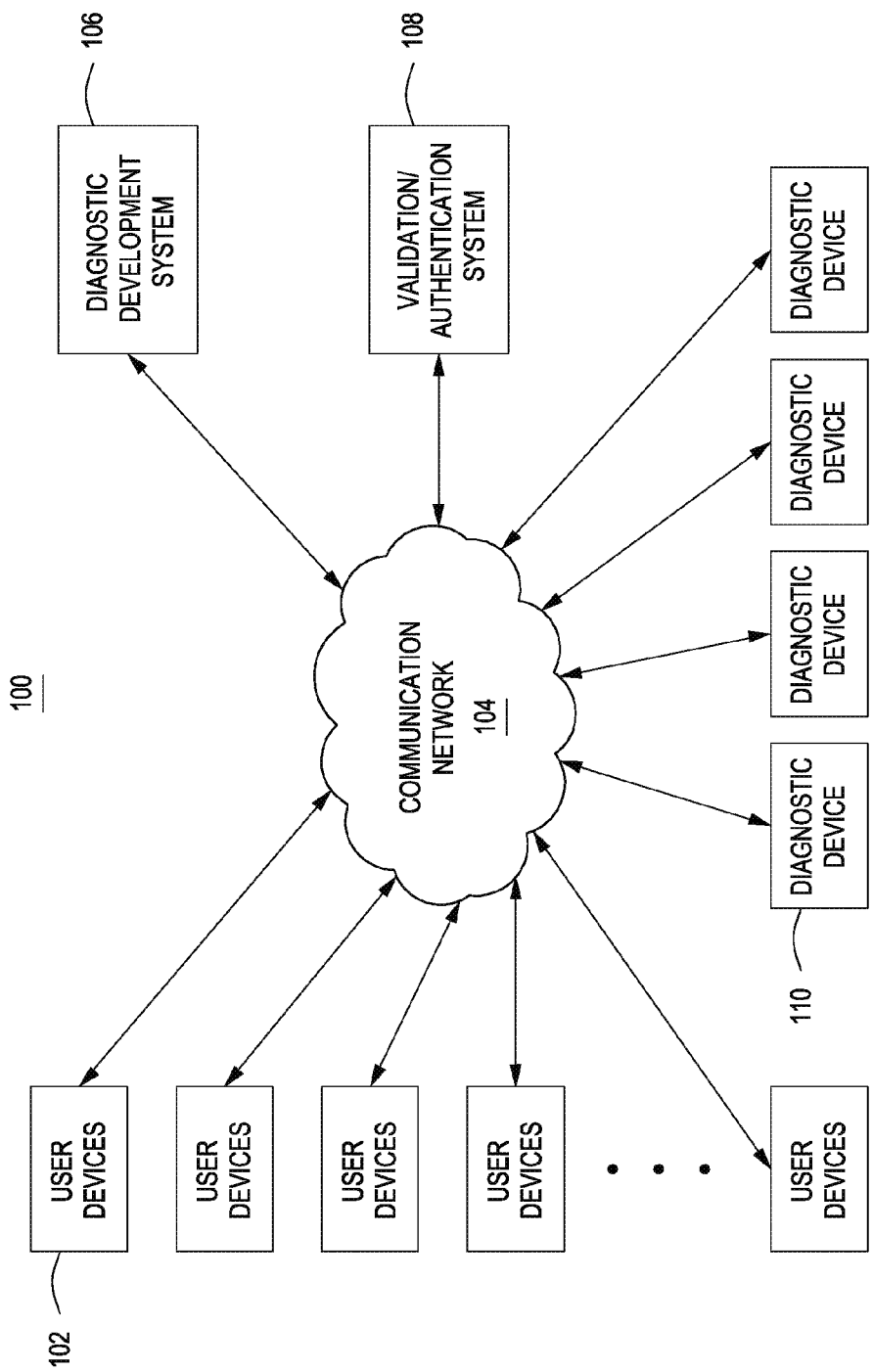
FIG. 1 illustrates an adaptive diagnostic development system in accordance with an embodiment of the present invention.

Referring to FIG. 1, there is shown an adaptive diagnostic development system 100 in accordance with an embodiment of the present disclosure. The adaptive diagnostic development system 100 may include a plurality of user devices 102 communicatively coupled, via a communication network 104, to a diagnostic development system 106, a validation/authentication system 108, a plurality of diagnostic devices 110 and any other components necessary to create and distribute diagnostic tests. In one embodiment, a user may use the user device 102 to access the diagnostic development system 106, which includes a plurality of functionality diagnostic blocks to create one or more diagnostic tests. In another embodiment, the user may download the diagnostic development system 106, onto the user device 102. The plurality of functionality diagnostic blocks may include software codes that may be executed to perform the steps or procedures of the diagnostic tests. Thus, the functionality diagnostic blocks may enable a user to create diagnostic tests without learning writing software codes using the software language.

For example, a user (e.g., a technician) may develop a new diagnostic test to test a new engine, however, the user may not be a software engineer or know how to write software codes. The user may utilize the functionality diagnostic blocks of the diagnostic development system 106 to formulate the new diagnostic test for the new engine. The diagnostic tests created by the user may be approved or validated by the validation/authentication system 108 in order to ensure that the diagnostic tests are operational and error free. In one embodiment, the validation/authentication system 108 may include libraries of software codes that may be used to compile the software codes of the newly created diagnostic tests. Also, the validation/authentication system 108 may identify or correct any errors in the newly created diagnostic tests or run simulations to see if the diagnostic test will work. The approved diagnostic tests may be distributed (based on subscription) to the plurality of diagnostic devices 110 to enhance the functionality of the diagnostic devices 110.

Although the diagnostic development system 106 is shown as an independent system, the diagnostic development system 106 may also be alternatively located entirely or partially on the user device 102, the validation/authentication system 108, the plurality of diagnostic devices 110 and/or a secondary system separate from the components of the adaptive diagnostic development system 100. This secondary system may include a database, server, or the like that connects to the communication network 104 and provides the functionality described herein.

The plurality of user devices 102 may include, but not limited to, a mobile phone, a smart phone, a computer, a personal computer, a laptop, a cellular communication device, a workstation, a mobile device, a phone, a television, a handheld PC, a personal digital assistant (PDA), a thin system, a fat system, a network appliance, an Internet accessible device, netbook, tablet computer, or other any other device that may be in communication with one or more of the diagnostic development system 106, the validation/authentication system 108 and/or the plurality of diagnostic devices 110 via the communication network 104. The plurality of user devices 102, the diagnostic development system 106, the validation/authentication system 108 and/or the plurality of diagnostic devices 110 may communicate with each other via a wired or wireless link or any combination thereof.

The communication network 104 may couple the plurality of user devices 102 and the plurality of diagnostic devices 110 to the diagnostic development system 106 and/or the validation/authentication system 108. The communication network 104 may be a wireless network, a wired network or any combination thereof. In one embodiment, the communication network 104 may include one or more of a fiber optic network, a passive optical network, a cable network, an Internet network, a satellite network (e.g., operating in Band C, Band Ku or Band Ka), a wireless LAN, a Global System for Mobile Communication (GSM), a Personal Communication Service (PCS), a long term evolution (LTE) network, a Personal Area Network (PAN), D-AMPS, Wi-Fi, Fixed Wireless Data, IEEE 802.11, 802.15.1, 802.11n and 802.11g network or any other wired or wireless network for transmitting and receiving a data signal. In addition, the communication network 104 may include, without limitation, telephone line, fiber optics, IEEE Ethernet 802.3, wide area network (WAN), local area network (LAN), or global network aspects such as the Internet. The communication network 104 may support an satellite network, a wireless communication network, a cellular network, or the like, or any combination thereof.

The communication network 104 may further include one, or any number of the exemplary types of networks mentioned above operating as a stand-alone network or in cooperation with each other. Although the communication network 104 is depicted as one network, it should be appreciated that according to one or more embodiments, the communication network 104 may include a plurality of interconnected networks, such as, for example, a service provider network, the Internet, a broadcaster's network, a cable television network, corporate network, home network and the like.

The diagnostic development system 106 may include one or more servers such as a UNIX based server, Windows 2000 Server, Microsoft IIS server, Apache HTTP server, API server, Java server, Java Servlet API server, ASP server, PHP server, HTTP server, Mac OS X server, Oracle server, IP server, other independent server or the like to support operations of a client. Also, the diagnostic development system 106 may include one or more of an Internet Protocol (IP) network server or public switch telephone network (PSTN) server. The diagnostic development system 106 may include one or more databases for storing a network model topology and network policies based at least in part on the network model topology.

The validation/authentication system 108 may include one or more servers to approve and review the diagnostic tests created using the diagnostic development system 106 and distribute the diagnostic tests to the plurality of diagnostic devices 110. In one embodiment, the validation/authentication system 108 may include a UNIX based server, Windows 2000 Server, Microsoft IIS server, Apache HTTP server, API server, Java server, Java Servlet API server, ASP server, PHP server, HTTP server, Mac OS X server, Oracle server, IP server, other independent server or the like to review, simulate, and approve the diagnostic tests created via the diagnostic development system 106. Also, the validation/authentication system 108 may include one or more of an Internet Protocol (IP) network server or public switch telephone network (PSTN) server.

The validation/authentication system 108 may include one or more memory storage devices including, without limitation, paper card storage, tape storage, magnetic tape, disk storage, gramophone record, floppy disk, hard disk, ZIP disk, holographic, molecular memory or the like. The one or more storage devices may also include, without limitation, optical disc, CD-ROM, CD-R, CD-RW, DVD, DVD-R, DVD-RW, DVD+R, DVD+RW, DVD-RAM, Blu-ray, Minidisc, HVD, Phase-change Dual storage device and the like. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

The plurality of diagnostic devices 110 may include any computing device, including a computer, a personal computer, a laptop, a cellular communication device, a workstation, a mobile device, a smart phone, a television, a handheld tablet, a personal digital assistant (PDA), a thin system, a fat system, a network appliance, an Internet computing device, or other any other device. The plurality of diagnostic devices 110 may include software implemented on the computing device in order to perform diagnostic tests. In another example, the plurality of diagnostic devices 110 may be, for example, the Genisys® diagnostic tool from Service Solutions U.S. LLC, in Owatonna, Minn. or Elite Autoscanner® Pro CP9190 from Actron (a unit of Service Solutions).

In other embodiments, the plurality of diagnostic devices 110 may be Internet accessible device, netbook, tablet computer, or other any other device that may be in communication with the user device 102, the diagnostic development system 106 and/or the validation/authentication system 108. The plurality of diagnostic devices 110 may further include one or more intermediary devices that may communicate with the communication network 104, such as a transmitter/receiver, router, modem, a transceiver or the like.

Figure 2:
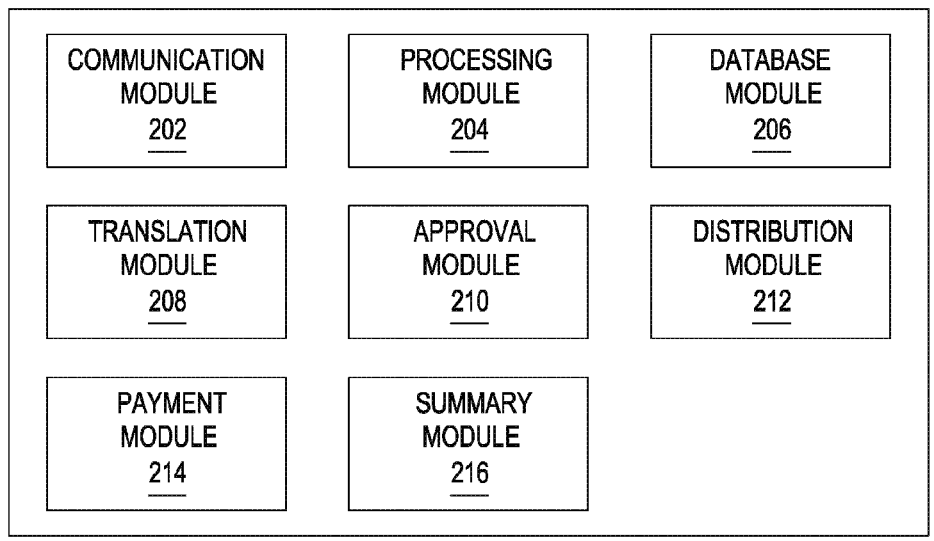
FIG. 2 illustrates a block diagram of hardware components of the validation/authentication system of the adaptive diagnostic development system in accordance with an embodiment of the present invention.

FIG. 2 is a block diagram of hardware components of the validation/authentication system 108 of the adaptive diagnostic development system 100 in accordance with an embodiment of the present invention. The validation/authentication system 108 may include a communication module 202, a processing module 204, a database module 206, a translation module 208, an approval module 210, a distribution module 212, a payment module 214, and a summary report module 216. It is noted that modules 202-216 are exemplary and the functions performed by one or more of the modules may be combined with that performed by other modules. The functions described herein as being performed by modules 202-216 also may be separated and may be located or performed by other modules.

The communication module 202 may include telecommunication circuitry and a computer processor to establish a communication path with one or more of the user device 102, the diagnostic development system 106 and/or the plurality of diagnostic devices 110 via the communication network 104. For example, the communication module 202 may include a user interface (e.g., a graphical user interface (GUI), an application programming interface (API)) or the like to transmit information between the user device 102, the diagnostic development system 106, or the plurality of diagnostic devices 110. For example, the communication module 202 may include a separate or unified graphical user interface to communicate with the user.

The communication module 202 may be communicatively coupled to other modules of the validation/authentication system 108. For example, the communication module 202 may receive information from the user, the plurality of user devices 102, the diagnostic development system 106 and/or the plurality of diagnostic devices 110 and provide the information to other modules of the validation/authentication system 108. In an exemplary embodiment, the communication module 202 may provide the received information to the processing module 204 for processing or the database module 206 for storing. For example, the communication module 202 may receive diagnostic tests from the user device 102 and/or the diagnostic development system 106.

The communication module 202 may provide the received diagnostic tests to other modules of the validation/authentication system 108. For example, the communication module 202 may provide the received diagnostic tests to the translation module 208 for compiling and translating the functional diagnostic blocks of the diagnostic development system 106 into executable software codes. Also, the communication module 202 may provide the received diagnostic tests to the approval module 210 for simulation, approval and validation. Further, the communication module 202 may provide the received diagnostic tests to the distribution module 212 to be distributed to the plurality of diagnostic devices 110.

The processing module 204 may include one or more computer processors and databases to access information from various modules of the validation/authentication system 108. For example, the processing module 204 may access information stored at the translation module 208, the approval module 210, the distribution module 212, the payment module 214 and the summary report module 216 to complete the approval or validation of the newly created diagnostic tests. The database module 206 may include one or more physical memories that may be used to store diagnostic tests.

The translation module 208 may include one or more physical memories to store a plurality of software code libraries and one or more computer processors to compile and translate the diagnostic tests using the plurality of software code libraries. In one embodiment, the translation module 208 may translate the functional diagnostic blocks of the diagnostic tests into executable software codes that may be executed on the plurality of diagnostic devices 110. The translation module 208 may also compile the software codes to identify one or more errors of the diagnostic tests. In an exemplary embodiment, the translation module 208 may automatically correct the errors identified in the diagnostic tests or report the identified errors to the user so that the user may correct the errors identified in the diagnostic tests.

The approval module 210 may include one or more physical memories to store one or more rules and one or more computer processors to determine whether the newly created diagnostic tests satisfy the one or more rules. The one or more rules may include geographical rules, manufacturer rules, contractual rules, intellectual property rules, financial rules, cost rules, size rules and/or other rules that may be applied to the newly created diagnostic tools. For example, the approval module 210 may apply a geographical rule to determine whether the newly created diagnostic tests are valid within a geographical region. That is cold climate diagnostic tests not being used for warmer climates. Also, the approval module 210 may apply contractual rules to determine whether the newly created diagnostic tests violate any contracts. Further, the approval module 210 may apply intellectual property rules to determine whether the newly created diagnostic tests infringe any patents. In another example, the approval module 210 may apply financial rules to determine whether the newly created diagnostic tests violate any financial regulations (e.g., corporate regulations, tax regulations, banking regulations).

The distribution module 212 may include one or more physical memories to store approved or validated diagnostic tests. The distribution module 212 may categorize the diagnostic tests, such as being based at least in part on a year, make, model, components of the vehicle. The distribution module 212 may include one or more computer processors that may provide a graphical user interface or host an internet website to distribute the approved or validated diagnostic tests. For example, the distribution module 212 may host an Internet website having a plurality of webpages that may be used to distribute the diagnostic tests. A user may visit the Internet website and browse for the desired diagnostic tests and download the relevant diagnostic tests to the diagnostic device 110. In another exemplary embodiment, the distribution module 212 may program the diagnostic tests onto a non-transitory computer readable medium (e.g., a disk) to be distributed to the user and installed on the diagnostic device 110.

The payment module 214 may include one or more computer processors to facilitate a transaction to purchase desired diagnostic tests. For example, validation/authentication system 108 may charge a user a price to purchase the diagnostic tests. The payment module 214 may accept a payment to allow user to purchase the diagnostic tests via a credit card, and the payment module 214 may verify, authenticate and accept the credit card to purchase the diagnostic tests. The payment may also be prepaid ahead of time.

The summary report module 216 may include one or more physical memories to store transactions conducted by the validation/authentication system 108. For example, the summary report module 216 may track a number of diagnostic tests purchased or the number of times a diagnostic test is purchased by users. The summary report module 216 may track a number of diagnostic tests available for purchase. Also, the summary report module 216 may include one or more computer processors to print out a summary repot requested by a user.

Figure 3:
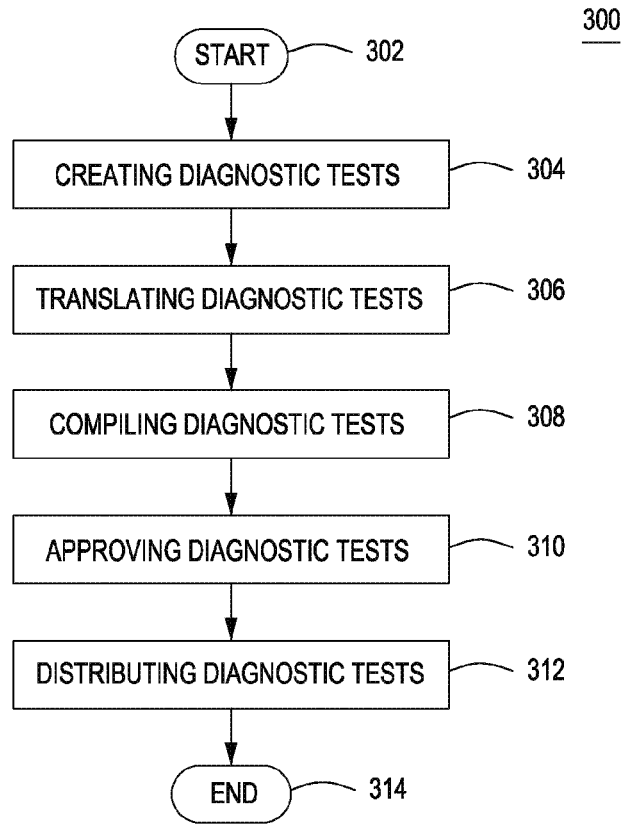
FIG. 3 a flow diagram for creating and distributing diagnostic tests in accordance with an embodiment of the present invention.

FIG. 3 is a flow diagram 300 for creating and distributing diagnostic tests in accordance with an embodiment of the present invention. This exemplary method 300 may be provided by way of example, as there are a variety of ways to carry out the method and can be executed or otherwise performed by one or a combination of various systems. The method 300 is described below may be carried out by the apparatus and components shown in FIGS. 1 and 2, by way of example, and various elements of the apparatus are referenced in explaining the example method of FIG. 3. Referring to FIG. 3, at block 302, the method 300 for creating and distributing diagnostic tests may begin.

At block 304, a diagnostic test may be created. For example, a technician may develop a diagnostic test to diagnose the transmission of a new model vehicle. For example, the technician may utilize the functional diagnostic blocks of the diagnostic development system 106 to create a new diagnostic test to diagnose the transmission or the electric system of a vehicle. Because the technicians have the most experience in diagnosing a problem of a vehicle, the technicians are in ideal positions to develop an efficient diagnostic test to diagnose problems of a vehicle.

At block 306, the diagnostic tests may be translated. For example, the translation module 208 may utilize the plurality of software code libraries to translate the functional diagnostic blocks of the diagnostic tests into executable software codes. For example, each functional diagnostic block may include executable software codes to perform one or more actions. The translation module 208 may search the plurality of software code libraries to identify executable software codes corresponding to the functional diagnostic blocks of the diagnostic tests being developed.

At block 308, the diagnostic tests may be compiled. The translation module 208 may compile the software codes of diagnostic tests in order to verify whether the diagnostic tests can function properly. For example, the translation module 208 may format the executable software codes that may conform to the specific computer language. Also, the translation module 208 may convert the executable software codes into machine executable codes (e.g., binary code) that may be executed by the diagnostic devices 110. The translation module 208 may identify an error associated with the diagnostic tests and automatically correct the error associated with the diagnostic tests.

At block 310, the diagnostic tests may be approved. For example, the approval module 210 may simulate, approve or authenticate the diagnostic tests based at least in part on one or more rules.

At block 312, the diagnostic tests may be distributed. For example, the distribution module 212 may post diagnostic tests on an Internet website hosted by the distribution module 212. A user may visit the Internet website and browse for the desired diagnostic tests. The user may purchase and download the desired diagnostic tests to the diagnostic device 110. The payment module 214 may process a payment made by a user or if prepaid, the various diagnostic device 110 can automatically receive the newly authenticated diagnostic tests.

At block 314, the method 300 for creating and distributing diagnostic tests may end.

Figure 4:
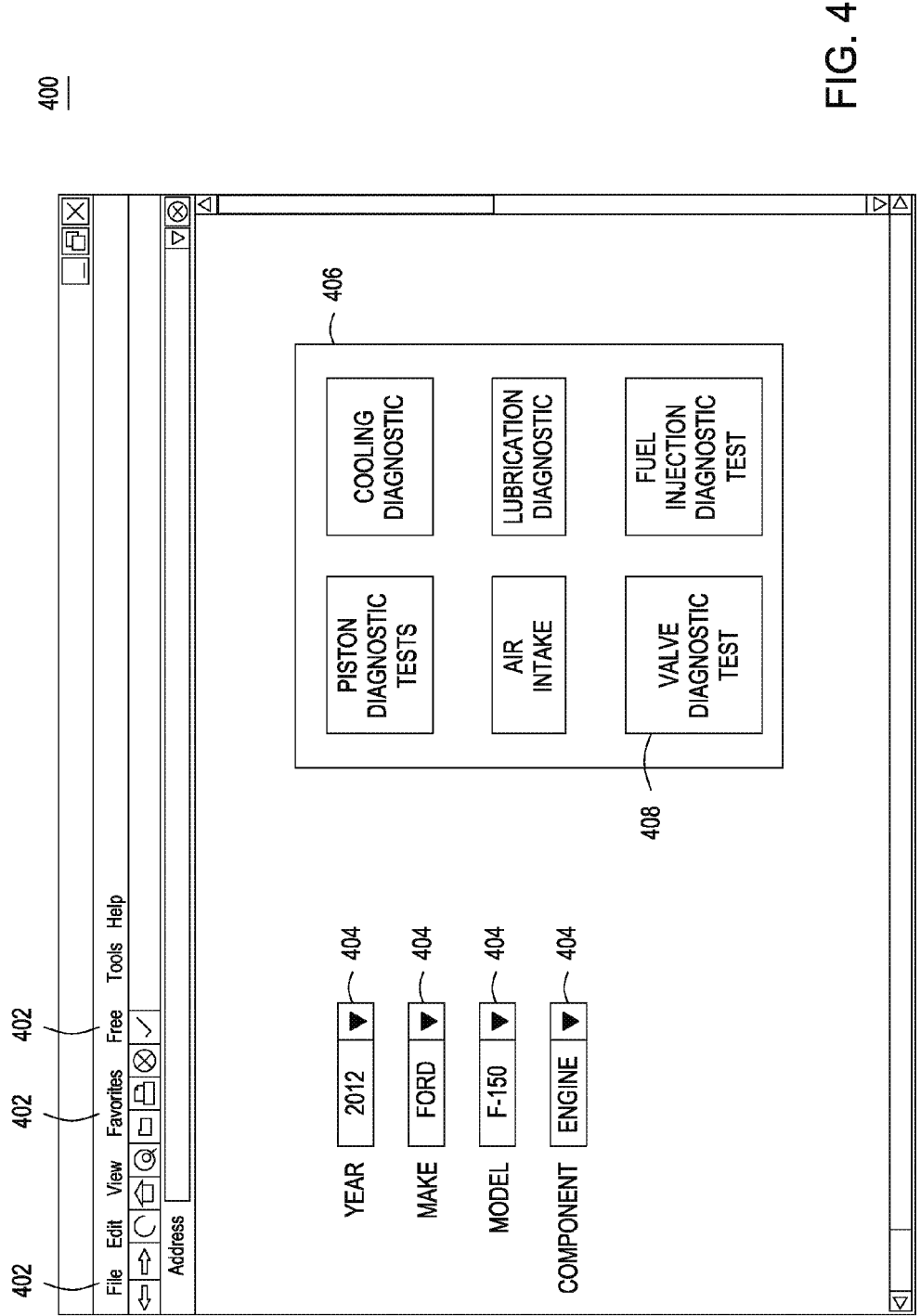
FIG. 4 is a screen shot of a graphical user interface of the system for creating and distributing diagnostic tests in accordance with an embodiment of the present invention.

FIG. 4 is a screen shot 400 of a graphical user interface of the system for creating and distributing diagnostic tests in accordance with an embodiment of the present invention. For example, a user may visit a website hosted by the adaptive diagnostic development system 100. The website may contain a webpage having a plurality of tabs 402. The plurality of tabs 402 may include a file tab, a favorite tab and/or a free tab. A user may select one or more search parameters 404 in order to find a desired diagnostic test. In an exemplary embodiment, the search parameters 404 may include a year, make, model, component and/or other parameters. A display area 406 may display one or more relevant diagnostic tests 408. For example, the display area 406 may display one or more relevant diagnostic tests 408 based at least in part on the search parameters 404. Once the diagnostic test 408 is selected, the diagnostic test 408 can be downloaded to the diagnostic device 110.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic test authoring system, comprising:
a diagnostic development system having a plurality of functional diagnostic blocks that when compiled into executable software code performs a vehicle diagnostic test;
a communication module having a telecommunication circuitry configured to receive a user's newly created diagnostic test created from the diagnostic development system that needs to be validated by the diagnostic test authoring system;
a translation module that translates the functional diagnostic blocks of the user's newly created diagnostic test into software code executable on a vehicle diagnostic device, the translation module is further configured to automatically correct any errors in the user's newly created diagnostic test;
a processing module configured to validate the user's newly created vehicle diagnostic test, wherein the validation ensures that the user's newly created vehicle diagnostic test is operational;
a distribution module that distributes the validated user's newly created vehicle diagnostic test to the vehicle diagnostic device; and
a payment module that charges the validated user's newly created diagnostic test distributed to the vehicle diagnostic device.

2. The authoring system of claim 1, further comprising an approval module determining whether the user's newly created diagnostic test satisfies one or more rules.

3. The authoring system of claim 2, wherein the one or more rules includes at least one of the following: geographical rules, contractual rules, intellectual property rules, financial rules, cost rules and size rules.

4. The authoring system of claim 3, wherein the rule is a manufacturer rule.

5. The authoring system of claim 3, wherein the rule is a geographical rule.

6. The authoring system of claim 2, wherein the approval module further simulating the user's newly created diagnostic test in order to validate the user's newly created diagnostic test.

7. The authoring system of claim 1, wherein the distribution module also categorizing the user's newly created diagnostic test.

8. The authoring system of claim 7, wherein the distribution module also categorizing the validated user's newly created diagnostic test based at least in part on a year, make, model, or components of a vehicle.

9. The authoring system of claim 1, wherein the distribution module also hosting an Internet website to distribute the validated user's newly created diagnostic test to the diagnostic device.

10. The authoring system of claim 1, wherein the distribution module also transferring the validated user's newly created diagnostic test onto a non-transitory computer readable medium.

11. A method of distributing user created diagnostic tests, the method comprising the steps of:
receiving, via a communication module that includes a telecommunication circuitry, one or more user's newly created diagnostic tests that needs to be validated by a diagnostic test authoring system, the one or more user's newly created diagnostic tests created with a diagnostic development system having a plurality of functional diagnostic blocks that when compiled into executable software code performs the diagnostic tests;
translating, via a translation module, the functional diagnostic blocks of the one or more user's newly created diagnostic tests into software code executable on a vehicle diagnostic device;
automatically correcting any errors in the one or more user's newly created diagnostic tests via the translating module;
validating, via a processing module having a processor, the one or more user's newly created diagnostic tests, wherein the validating step ensures that the one or more user's newly created vehicle diagnostic tests is operational;
receiving, with a payment module, a payment from a user of the vehicle diagnostic device for the one or more validated user's newly created diagnostic tests; and
distributing, via a distribution module, the one or more validated user's newly created diagnostic tests to the vehicle diagnostic device.

12. The method of claim 11, wherein the step of translating the one or more user's newly created diagnostic tests is done by using a plurality of software code libraries.

13. The method of claim 12, wherein the validating step includes simulating the one or more user's newly created diagnostic tests in order to confirm validity of the newly created diagnostic tests.

14. The method of claim 13, wherein the distributing step is performed automatically to an approved diagnostic device.

15. An authoring system, comprising:
a communication module having a telecommunication circuitry configured to receive one or more user's newly created diagnostic tests that require validation, wherein the validation ensures that the one or more user's newly created vehicle diagnostic tests is operational on a vehicle diagnostic device;
an approval module validating the one or more user's newly created diagnostic tests through a simulation of the one or more user's newly created diagnostic tests;
a translation module compiling and translating the functional diagnostic block created by the user into software codes executable on the vehicle diagnostic device;
a payment module receiving a payment for the validated one or more user's newly created diagnostic tests; and
a distribution module, via the communication module, distributing the one or more validated user's newly created diagnostic tests to the vehicle diagnostic device.

16. The authoring system of claim 15, wherein the approval module also determining whether the one of more user's newly created diagnostic tests satisfies a rule.

17. The authoring system of claim 16, wherein the rule is a geographical rule that determine whether the one or more user's newly created diagnostic tests will work for a particular geographical region.

18. The authoring system of claim 16, wherein the rule is a contract rule that determines whether the one or more user's newly created diagnostic tests will violate a contract.

19. The authoring system of claim 16, wherein the rule is a financial rule that determines whether the one or more user's newly created diagnostic tests will violate a financial regulation.

* * * * *